United States Patent [19]
Bustin

[11] 3,803,894
[45] Apr. 16, 1974

[54] METHOD OF AND APPARATUS FOR MANUFACTURING A PLURALITY OF CONTINUOUS SERRATED METAL STRIPS FROM A SINGLE STRIP OF FEED STOCK

[76] Inventor: Leopold Bustin, P.O. Box 589, Flanders, N.J. 07836

[22] Filed: July 21, 1972

[21] Appl. No.: 273,725

[52] U.S. Cl............ 72/324, 72/331, 72/332, 83/694
[51] Int. Cl............................................ B21d 43/28
[58] Field of Search............ 72/324, 332, 337, 339; 83/48, 213, 214, 237, 694, 697, 908, 679, 692, 925, 926

[56] References Cited
UNITED STATES PATENTS

| | | |
|---|---|---|
| 3,492,898 | 2/1970 | Benz................................ 83/237 |
| 3,113,742 | 12/1963 | Herr................................. 83/908 |
| 2,120,329 | 6/1938 | Henneke et al.................. 83/694 |
| 2,864,446 | 12/1958 | Olson et al...................... 83/694 |
| 265,294 | 10/1882 | Wineburgh...................... 83/694 |
| 2,997,907 | 8/1961 | Constantino..................... 83/692 |

Primary Examiner—Charles W. Lanham
Assistant Examiner—James R. Duzan
Attorney, Agent, or Firm—Popper, Bain, Bobis, Gilfillan & Rhodes

[57] ABSTRACT

Method of and apparatus for manufacturing a plurality of continuous serrated metal strips from a single strip of feed stock includes means for advancing the single strip of feed stock into a shear means. Exertion of a cutting force by a ram acting upon dies of the shear means causes shearing of the feed stock to form a plurality of serrated metal strips. Strip positioning means disposed on the discharge side of the shear means cooperating with hold-down means and frictional forces generated between the cut strips and the dies preclude deformation of the metal strips in a coil-like manner as has been heretofore known. Any kinks formed in the apparatus during shearing may be removed by a kink-removal device.

14 Claims, 8 Drawing Figures

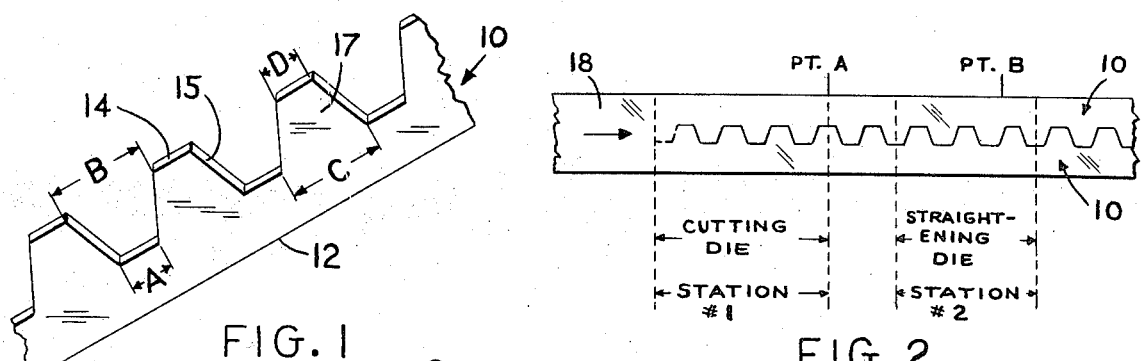
FIG. 1
FIG. 2
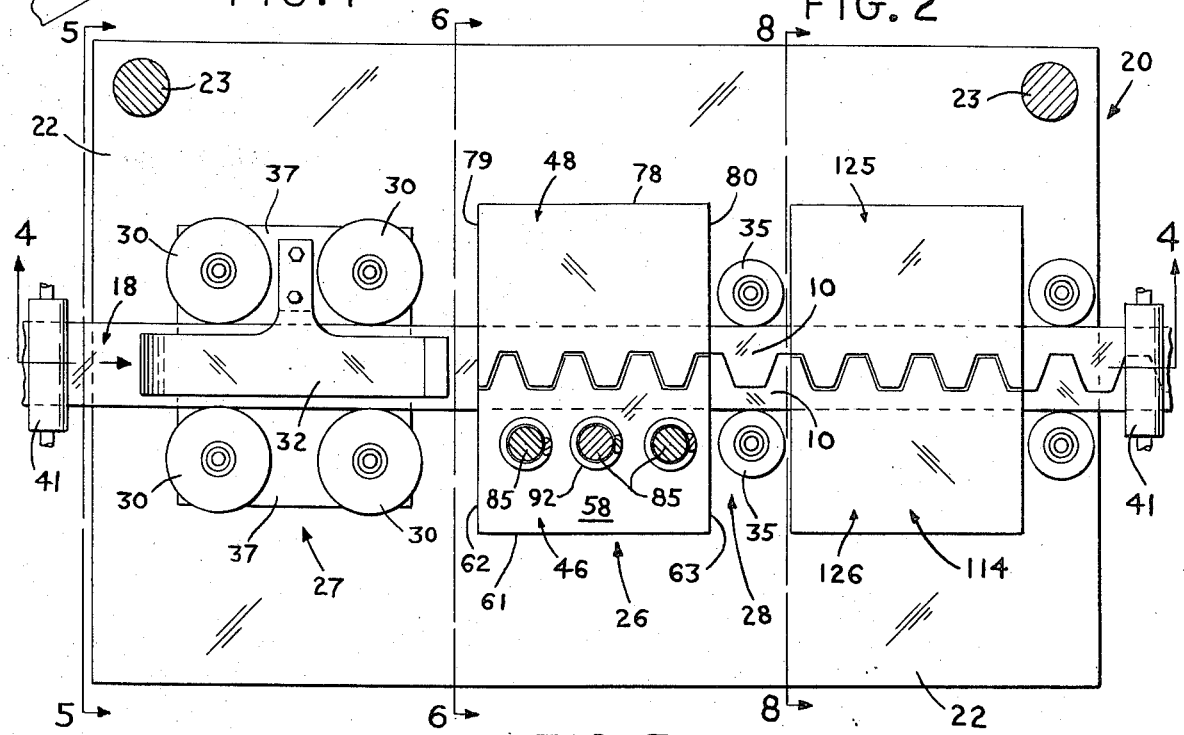
FIG. 3
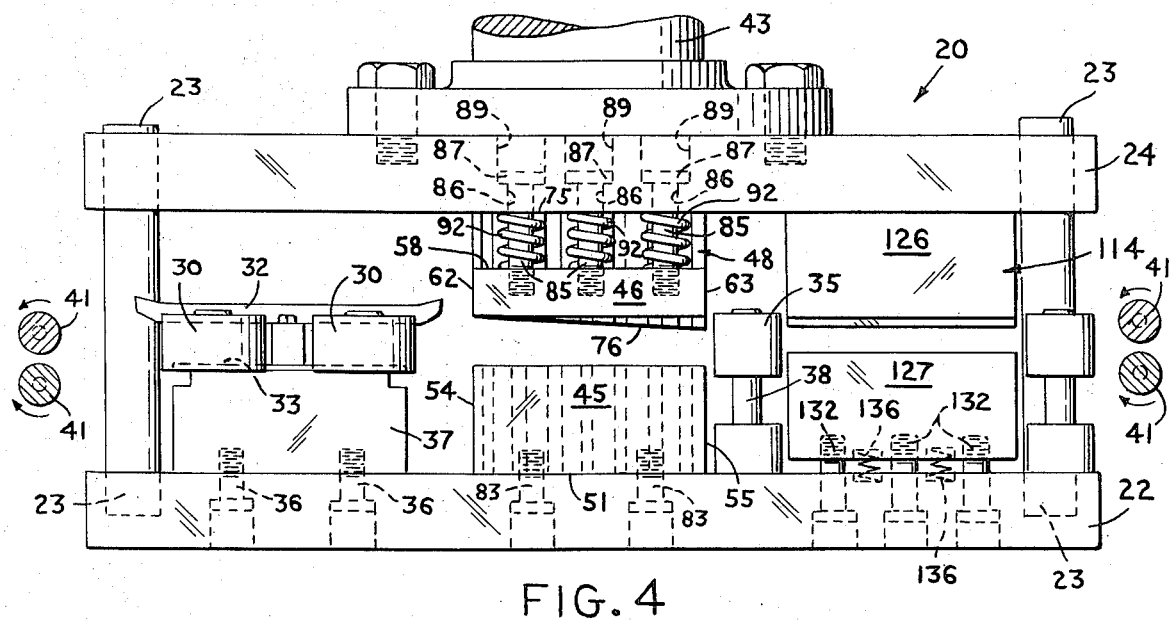
FIG. 4

METHOD OF AND APPARATUS FOR MANUFACTURING A PLURALITY OF CONTINUOUS SERRATED METAL STRIPS FROM A SINGLE STRIP OF FEED STOCK

BACKGROUND OF THE INVENTION

This invention relates generally to the field of metal cutting apparatus. Specifically, this invention relates to methods of and apparatus for manufacturing metal bars having serrated edges.

Metal bars having serrated edges have been widely accepted in the metal working field for various uses. For example, such bars are utilized as components in the manufacture of deck grating, to serve as structural support elements where a circulation of air or fluid under the supported member may be desirable, e. g., structural members in apparatus such as boilers, where it is desired to provide structural support without experiencing large areas of heat conductivity, and to serve as racks in rack and gear motion transmission apparatus.

The basic procedure in manufacturing metal strips having a serrated edge is to take a strip of metal feed stock and to form serrations of a desired shape in one edge. Such forming has been accomplished by milling or by punching.

In manufacturing serrated edge metal strip by milling, it is the accepted procedure to secure a plurality of strips in surface-to-surface engagement and mill the serrations in their edges by a continuous milling operation. It will be recognized by those skilled in these arts, however, that milling is an expensive manufacturing technique. Further, the milling of openings to form serrations in the metal generates waste metal material, viz. that material which is removed by the milling operation to form the serrations.

The second principal method of forming serrated edge metal strips is the method heretofore used by the applicant which involves punching the strip of feed stock to form serration defining openings in the strip edge. Specifically, a strip of feed stock is positioned under a punching device which punches or "nibbles" material from the strip edge to form the serrations. Although generally satisfactory, this method has proven disadvantageous because it has resulted in material wastage, i.e., the material of the punched slug is lost. Further, relatively long strips, e.g., strips in excess of 4 feet cannot be manufactured satisfactorily because of transverse deformation of the strip. Specifically, the punching operation on the strip causes the strip to be deformed away from the punched edge thereby causing a tendency toward permanent setting of the material and a resulting coiling effect which is unacceptable.

Rotating cutting devices have been suggested for effecting the manufacture of continuous strips having serrated edges. However, the rotating shears and punches which would be utilized are expensive to manufacture and to maintain and their use does not avoid the incidence of transverse deformation of the material and the resulting "coiling" effect noted above.

SUMMARY OF THE INVENTION

It is an object of the present invention therefore, to provide a method of and apparatus for manufacturing a plurality of continuous serrated metal strips from a single strip of feed stock without experiencing material wastage and without the occurrence of transverse strip deformation.

It is a further object of the present invention to provide a method of and apparatus for manufacturing a plurality of continuous serrated metal strips from a single continuous strip of feed stock.

These objects and others are achieved by the apparatus of the present invention, one embodiment of which may include shear means comprising a plurality of cooperating die elements having cutting surfaces formed to define serrations, means for advancing a continuous strip of feed stock into the shear means, and means for displacing the shear means to cause shearing of the feed stock to form a plurality of continuous serrated metal strips.

A method of manufacturing a plurality of continuous serrated metal strips from a single strip of feed stock may include the steps of advancing the single strip of feed stock into a shearing means, positioning the single strip of feed stock within the shearing means, advancing the shearing means to cut a serration in the continuous strip of feed stock to form a plurality of continuous serrated strips.

BRIEF DESCRIPTION OF THE DRAWINGS:

A more complete understanding of the present invention may be had from the following detailed description thereof, particularly when read in the light of the accompanying drawings, wherein:

FIG. 1 is a perspective view of a serrated metal strip manufactured in accordance with the method and apparatus of the present invention;

FIG. 2 is a plan view of a continuous metal strip during various phases of manufacturing according to the method and apparatus of the present invention;

FIG. 3 is a plan view, partly in cross-section, of apparatus according to the present invention for practicing the method of the present invention;

FIG. 4 is a cross-sectional elevational view through the plane 4—4 of FIG. 3;

DETAILED DESCRIPTION

Figure 5:
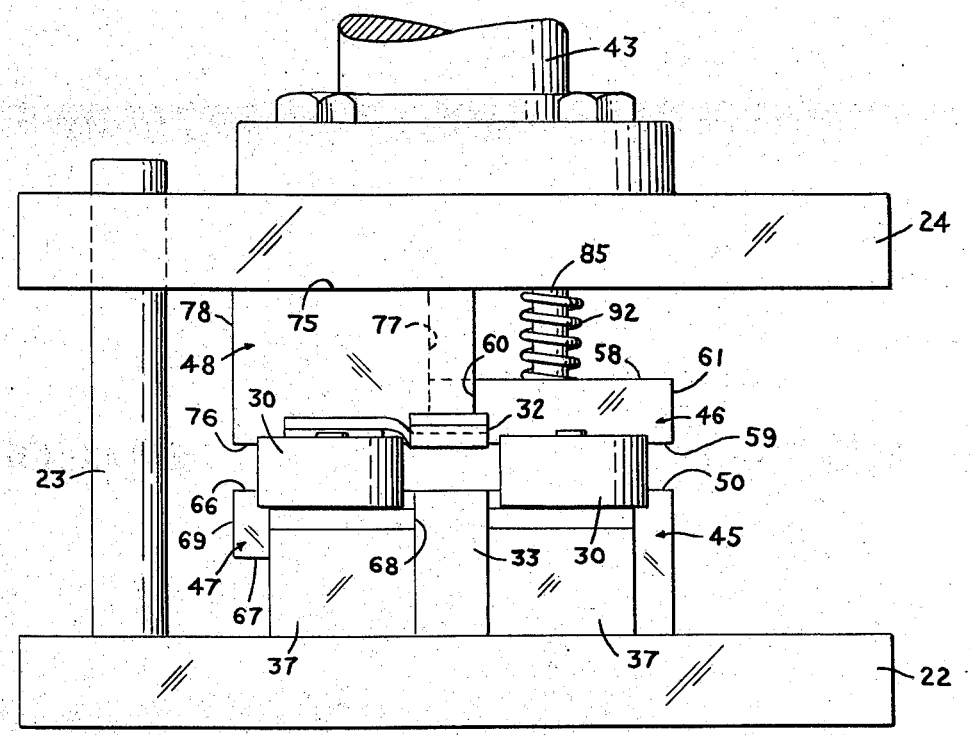
FIG. 5 is an end elevational view through the plane 5—5 of FIG. 4.
Figure 6:
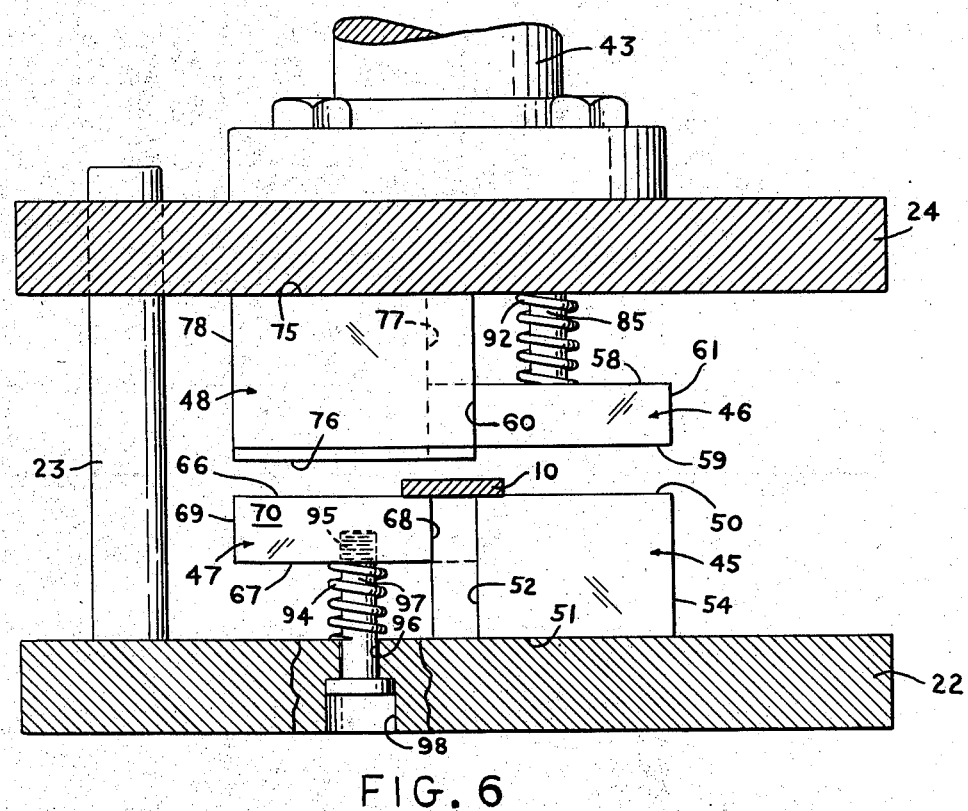
FIG. 6 is a cross-sectional elevational view through the plane 6—6 of FIG. 4.

Referring therefore to FIG. 1, a continuous metal strip having a serrated edge and manufactured in accordance with the teachings of the present invention is designated generally by the reference numeral 10.

Continuous strip 10 is a generally longitudinally extending strip having a first longitudinally extending edge 12 and a second longitudinally extending edge 14. Formed to extend transversely into second longitudinally extending edge 14 are a plurality of longitudinally spaced relieved portions 15. Relieved portions 15 are generally trapezoidal in cross-sectional configuration and comprise a base dimension $A$ and an opening dimension $B$. As is evident from FIG. 1, the formation of relieved portions 15 defines transversely extending tooth-like elements 17. Tooth-like elements 17 are generally trapezoidal in shape and have a root dimension $C$ and a top dimension $D$. For reasons which will be explained in detail below, the base dimension $A$ of each relieved portion 15 is substantially equal to the root dimension $C$ of tooth-like elements 17.

There is shown in FIG. 2 a plan view of a continuous strip 18 of feed stock metal as it is fed through apparatus according to the present invention and sheared to form a pair of continuous strips 10. As the strip 18 of feed stock metal is advanced from left to right as seen in FIG. 2, it is positioned by the advancing means at a first station where the feed stock strip is cut. Thereafter, continued advance of the feed stock causes its positioning at a second station where any kinks in the material are straightened so as to form a pair of serrated metal strips 10. It should be noted that the advancement of material from the first station to the second station causes the advance of the material at the end of the recently cut section designated as point $A$ on FIG. 2 to a point $B$ which is well within the bounds of the second station whereby to permit total straightening of the strip.

Referring to FIGS. 3–8, there is shown schematically an apparatus according to the present invention which is designated generally by the reference 20. Apparatus 20 includes a foundation structure having a base support 22, a plurality of stanchions 23 and an upper support 24. Stanchions 23 extend vertically between the base support 22 and the upper support 24 and are disposed adjacent the corner of supports 22 and 24 in the embodiment described. It should be noted, however, that the locations of the stanchions 23 or, for that matter, the specific manner of supporting the upper and lower foundation elements is not critical so long as the structure is capable of supporting the operating loads without disabling deflection.

Disposed generally centrally of the foundation structure is a shearing means designated generally by the reference numeral 26 (FIG. 3). As is discussed in detail below, shearing means 26 includes a plurality of dies and die support means. Disposed on the feed and discharge sides of shearing means 26 are a feed positioning means 27 and a product positioning means 28, respectively.

Feed positioning means 27 comprises a plurality of roller guides 30 and upper and lower slide supports 32 and 33. Roller guides 30 cooperate to position feed stock 18 transversely as it is advanced into shearing means 26. Upper and lower slide supports 32 and 33 cooperate to position feed stock 18 vertically as it is advanced into shearing means 26. Product positioning means 28 comprises a plurality of guide rollers 35 which cooperate to position the shearing means transversely as they are discharged from shearing means 26.

As best may be seen from FIGS. 4 and 5, feed positioning roller guides 30 are mounted on pedestals 37 which are supported upon and secured to base support 22 in any suitable manner such as by bolts 36. Roller guides 30 are secured to pedestals 37 in such a manner as to permit free rotation of the rollers during operation of the apparatus. In the embodiment of apparatus described herein, guide rollers 30 are ball bearing mounted with their inner races secured to posts (not shown) which are mounted in pedestals 37. Disposed between pedestals 37 is lower slide support 33 (FIG. 5) which comprises a block member the upper surface of which is adapted to define a support surface for stock being advanced into apparatus 20.

Upper slide support 32 is a shaped metal strip secured to one pedestal 37 in any suitable manner, e.g., by screws. The upper slide support is a generally T-shaped member having its base secured to one pedestal 37 and its cross-bar disposd between guide rollers 30. Each end of the cross-bar portion of the guide is bent upwardly to present an open aspect to the entry and discharge of strip feed stock 18. Product positioning roller guides 35 comprise rollers 35 mounted on a pedestal means 38 which are secured to base support 22 and which permits free rotation of guide rollers 35.

Strip feed stock 18 is introduced to the apparatus by a feed stock advancing mechanism, e.g., motor driven rollers 41 as shown in FIGS. 3 and 4. It should be noted that such feed stock advancing mechanisms are generally known to those skilled in these arts and any of the many such advancing mechanisms which are generally known may be utilized in conjunction with the present invention. Stock 18 is fed by rollers 41 into feed positioning means 27. As will be recognized by those skilled in these arts, feed positioning means 27 positions the feed strip 18 transversely by the effect of rollers 30 bearing upon the strip edges, and vertically by the effect of upper and lower slide supports 32 and 33 restraining the feed stock 18 against vertical movement.

Upon being discharged from feed positioning means 27, the strip of feed stock is advanced into shearing means 26 wherein it is sheared to form a pair of continuous serrated strips 10. Shearing of feed stock 10 is accomplished by the cooperation of a plurality of dies, discussed below in detail, in response to the operation of a force-exerting ram 43.

Considering in detail the structure of shearing means 26, and with particular reference to FIGS. 3–8, it can be seen that shearing means 26 includes four die members, viz. a bed die 45, a hold-down die 46, a reaction die 47 and a cutting die 48. Bed die 45 is a generally elongated member having an upper surface 50, a lower surface 51, an inner surface 52, an outer surface 53, a feed end 54 and a product end 55.

Similarly, hold-down die 46 is a generally elongated member having an upper surface 58, a lower surface 59, an inner surface 60 and an outer surface 61, a feed end 62 and a product end 63. Hold-down die 46 is disposed vertically above bed die 45.

Reaction die 47, disposed transversely adjacent bed die 45 and vertically under cutting die 48, is a generally elongated member having an upper surface 66, a lower surface 67, an inner surface 68, an outer surface 69, a feed end 70 and a product end (not shown).

Cutting die 48 is disposed transversely adjacent hold down die 46 and vertically above reaction die 47. Structurally similar to the other dies, cutting die 48 is a generally elongated member having an upper surface 75, a lower surface 76, an inner surface 77, an outer surface 78, a feed end 79 and a product end 80. As will be recognized by those skilled in these arts, dies 45–48 may be manufactured of any acceptable tool steel in accordance with accepted practices.

As best may be seen in FIG. 4, bed die 45 is supported on base support 22 and secured thereto by a plurality of bolts 83 which are securely received in suitable apertures in base support 22 and threadedly received within tapped openings formed in the lower surface 51 of bed die 45.

Hold-down die 46 is rigidly secured to a plurality of slide bolts 85 which extend slidably through suitable openings 86 formed in upper support member 24. Each slide bolt 85 has an enlarged head 87 formed on its upper end, which heads cooperate with counter bores 89 formed in upper support member 24 to limit the downward movement of bolts 85. Slide bolts 85 are threadedly secured within tapped bores formed in the upper surface 58 of hold-down die 46. Disposed around each slide bolt 85 and in bearing engagement with the upper surface of upper support 24 and the upper surface 58 of hold-down die 46 are a plurality of springs 92. Springs 92 are in compression and tend to urge hold-down die 46 downwardly toward bed die 45.

Disposed transversely adjacent bed die 45 is a reaction die 47 which is resiliently mounted on a plurality of coil springs 94. More specifically, the lower surface 67 of reaction die 47 is provided with a plurality of vertically extending tapped bores 95 within which are rigidly received a plurality of guide bolts 97. Each of guide bolts 97 is slidably secured within bores 96 formed in base support 22 and each is provided with an enlarged head to cooperate with a counter bore 98 in bore 96 to limit the upward sliding movement bolts 97. Springs 94 are sized to be of such a lenght that in their fully extended or unloaded position, the upper surface 66 of reaction die 47 is substantially co-planar with the upper surface 50 of bed die 45. Springs 94 are ordinarily chosen such as to provide a relatively high resistance to deflection so as to insure a proper reaction surface for cutting die 48 and to effect proper stripping of the cut serrated strip 10 upon the completion of the shearing operation.

Disposed transversely adjacent hold-down die 46 and vertically above reaction die 47 is cutting die 48. Cutting die 48 is rigidly secured to upper support member 24 by a plurality of bolts 85 which are received within suitable bores formed in support member 24 and secured within tapped bores formed in the upper surface 75 of cutting die 48. As best may be seen in FIG. 4, the lower surface 76 of cutting die 48 is tapered upwardly from right to left at a slight angle, e.g., 3° to the horizontal. This taper permits a gradual engagement of the cutting edge of the die during shearing and a progressive cutting of the continuous strip.

After being sheared in accordance with the teaching of the present invention, the serrated strips 10 pass outwardly of shearing means 26, i.e., from left to right as seen in FIGS. 3 and 4, through transverse roller guides 35. As was noted above, an important feature of the present invention is that the serrated strips formed by its practices are not coiled, i.e., deflected transversely outwardly from the axis of advance. The ability of the present invention to avoid coiling results from a plurality of factors including the cooperation of the respective dies in rigidly restraining the strip material against transverse movement during cutting, the frictional bond generated between the surface of the severed material and the cutting die and the restraining effect of product positioning roller guides 35.

Figure 8:
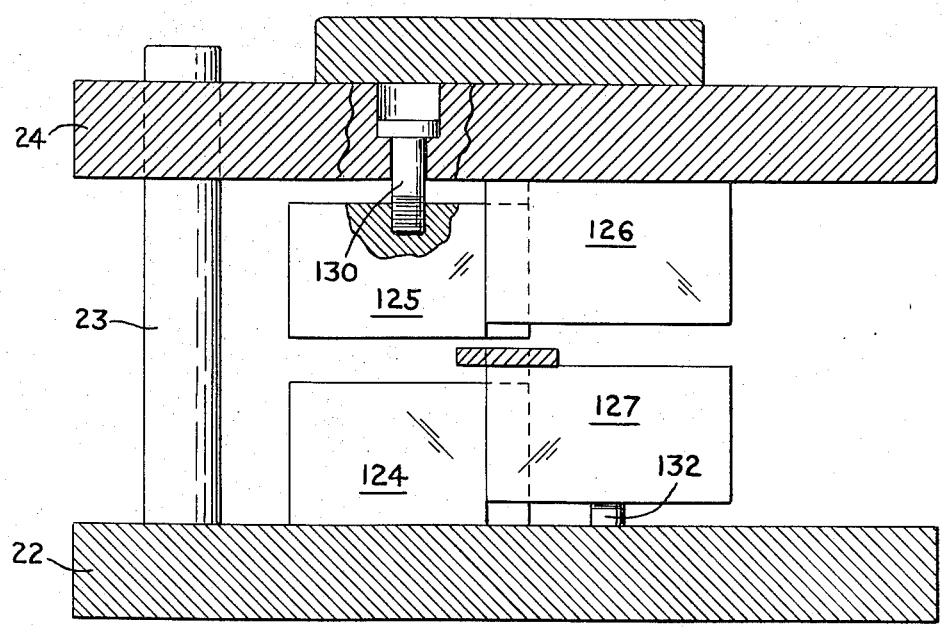
FIG. 8 is a cross-sectional view through the plane 8—8 of FIG. 3.

Continuous serrated strips 10 which are advanced out of shearing means 26 through transverse positioning rollers 35 are advanced into a straightener or kink removing means designated generally by the reference numeral 114. Kink remover 114 comprises a plurality of bearing plates 124, 125, 126 and 127 (FIG. 8). Bearing plates 124 and 126 are rigidly secured to base and upper supports 22 and 24, respectively, by suitable means such as bolts (not shown).

Bearing plates 125 and 127 are each provided with tapped bores in which are received bolts 130 and 132 respectively. Bolts 130 are slidably received within bores formed in upper support 24 and each bolt is provided with an enlarged head to limit the downward movement of the bolts and therewith bearing plate 125. The lower surface of upper support 24 and the upper surface of bearing plate 125 are provided with registering shallow bores in which are mounted coil springs (not shown). The springs are under compression and tend to force bearing plate 125 downwardly away from upper support 24.

Similarly, bolts 132 are slidably received within bores formed in base support 22 and each bolt is provided with an enlarged head to limit the upward movement of the bolts and therewith bearing plate 127. The upper surface of base support 22 and the lower surface of bearing plate 127 are provided with registering shallow bores in which are mounted coil springs 136. Springs 136 are under compression and tend to force bearing plate 127 upwardly away from base support 22. The maximum displacement of bearing plates 125 and 127 with respect to the surfaces of upper plate 24 and base plate 22 respectively is adjustable by rotation of bolts 130 and 132. In the embodiment shown, the maximum displacement of the bearing plates from their respective support plate surfaces is set at a dimension substantially equal to the thickness of the strip being cut.

As best may be seen in FIG. 3, the inner surfaces of the dies of shearing means 26 are machined to define generally vertically extending interlocking teeth. The teeth of the respective dies define the shape of the serration to be formed in feed stock 18 to form continuous serrated strips 10. Thus, in the embodiment of the invention described herein, the serrations are generally trapezoidal in configuration. It should be recognized, however, that the serrations may be any suitable shape as desired.

Considering therefore the operation of apparatus 20 to form a plurality of serrated strips 10 from a single strip of feed stock 18, the initial strip of feed stock 18 is fed into advancing roller 41 and advanced thereby into shearing means 26. Ram 43 is then displaced downwardly and the force exerted by ram 43 upon upper plate 24 is transmitted to cutting die 48. The force exerted by ram 43 causes the displacement of cutting die 48 against the resistance of spring loaded reaction die 47 to cause progressive cutting of feed stock 18 to form continuous serrated strips 10. The continued advance of ram 43 causes displacement of dies 47 and 48 from the position shown in FIG. 6 to the position shown in FIG. 7 which corresponds to the positions of dies 47 and 48 upon the completion of cutting of feed stock 18.

Figure 7:
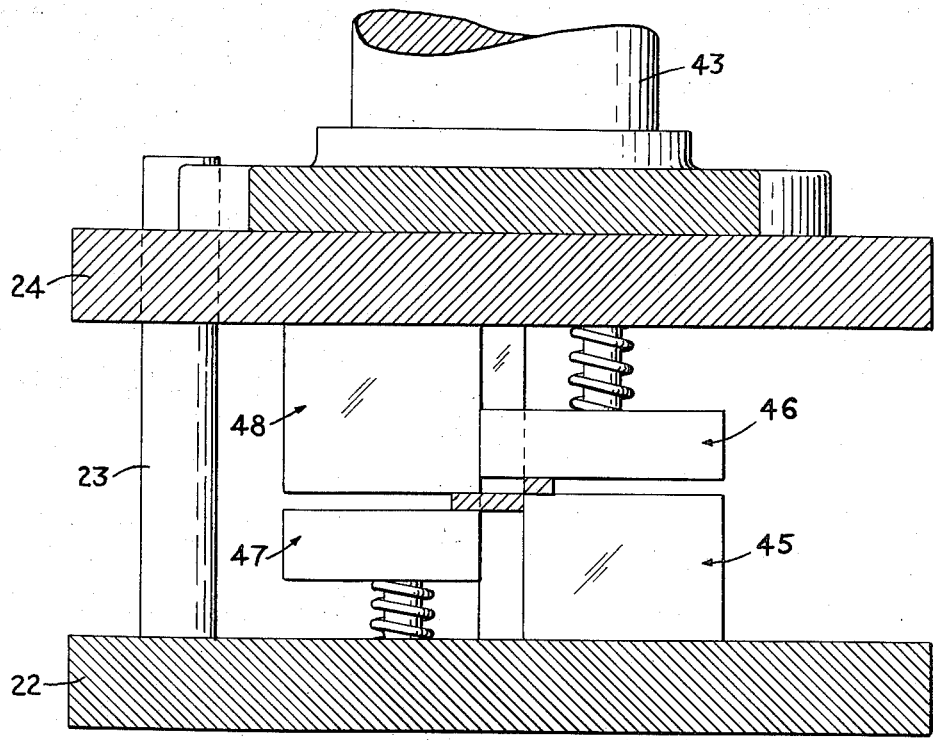
FIG. 7 is a cross-sectional elevational view, similar to the view of FIG. 6, but showing the operation of the present invention after the occurrence of cutting.

It should be noted in FIG. 7 that the continued advance of ram 43 causes upper support plate 24 to slide downwardly around slide bolts 85. Thus, during the cutting or shearing operation, hold-down die 46 is urged against bed die 45 solely by the force exerted by coiled springs 92 which are disposed between upper support member 24 and the upper surface 58 of hold-down die 46 as discussed above.

Upon the completion of the advances of ram 43 and the cutting of feed stock 18, the cycle of the motive means (not shown) is reversed and ram 43 is displaced vertically upwardly. Displacement of ram 43 vertically upwardly causes a corresponding displacement of upper support plate 24 upwardly causing a corresponding displacement of reaction die 47 upwardly in response to the assertion of upward force by coiled spring 94. Continued upward displacement of ram 43 causes the upper support plate 24 to come into engagement with the enlarged heads 87 of slide bolts 85 thereby causing upward displacement of slide bolts 85 and therewith hold-down die 46.

With both cutting die 48 and hold-down die 46 displaced upwardly away from the upper surfaces of bed die 45 and reaction die 47, advancing rollers 41 are actuated to advance feed stock 18 and therewith serrated strip portion 10 through shearing means 26. The amount of advance for each cycle is substantially equal to the length of the dies of shearing means 26. Thus, material that was in a plane with the feed ends 54, 62, 70 and 79 of bed die 45, hold-down die 46, reaction die 47 and cutting die 48 respectively at the outset of the shearing process is displaced during advancement of feed stock 18 to a point which is co-planar with the product ends 55, 63, 71 and 80 of the bed die 45, hold-down die 46, reaction die 47 and cutting die 48, respectively, which point corresponds to point A in FIG. 2. Thus, the cutting of the material in shearing means 26 is continuous and results in a continuous serrated strip.

With the feed stock 18 advanced from the feed end of shearing means 26 to the product end of shearing means 26, the downward displacement of ram 43 is again initiated and shearing of that portion of feed stock 18 within shearing means 26 is effected. Upon completion of this next subsequent shearing operation, roller means 41 are again actuated to advance feed stock 18 into shearing means 26. Those portions of the newly formed serrated strips 10 which were co-planar with the product ends of the dies of shearing means 26 are advanced into straightener or kink removing means 114. Kink removing means 114 is located longitudinally such that the advancement of newly formed serrated strips 10 causes those portions of the serrated strips which were co-planar with the product ends of the dies of shearing means 26 to be received substantially centrally of the dies of kink removing means 114, i.e. at a point corresponding to Point B in FIG. 2.

It should also be noted that the advancement of ram 43 and therewith upper support plate 24 causes a corresponding advancement of bearing plates 125 and 126 of kink removing means 114. The advancement of bearing plates 125 and 126 causes a compressive stress to be generated against serrated strips 10 by pinching the strips between upper plates 125 and 126 and lower plates 124 and 127. Thus, the reaction generated by the bearing plates is such as to cause any vertical deformation of continuous serrated strips 110 to be straightened and thereby permitting the manufacture of a continuous, uniform serrated strip material.

As is evident from the foregoing, the passage of feed stock material 18 through advancement rollers 41 is such as to cause the feed stock 18 to pass through feed positioning means 27 in order to properly introduce 26. feed stock into shearing means 27. Further, the continued advancement of feed stock 18 through shearing means 26 causes the advancement of continuous serrated strip 10 through guide positioning means 35 so as to insure the minimization or preclusion of transverse deformation of the serrated strips.

It is considered to be evident that the Figures with respect to which the foregoing detailed description has been made show clearly that the formation of serrations on strips 10 is accomplished by the cutting of a single sinuous line down the central portion of a continuous strip of feed stock 18. The formation of continuous serrated strips in this manner can be seen to eliminate the occurrence of waste material and also eliminate the occurrence of transverse deformation of material during forming which has been a substantial problem in the art heretofore. Finally, the positioning of guide means at all points in the process cooperates with hold-down pressure and frictional forces to preclude the occurrence of transverse deformation and coiling of the serrated strips thus providing a continuous, true section of serrated strip material.

It should also be recognized that the method and apparatus of the present invention may form the basis for manufacturing a plurality of serrated metal strips in excess of two from a single wide strip or plate of feed stock material. This, of course, would be accomplished by providing a plurality of cutting dies having alternate serrated and straight cutting edges whereby to manufacture strips having a straight edge and a serrated edge. Further, strips with opposed serrated edges could also be manufactured.

The operation of the apparatus of the present invention also lends itself to use in cutting the serrated metal strips to any desired length. The cutting procedure may be accomplished concurrently with the shearing step because the stock is stopped and cutting may conveniently be achieved at this stage in the operation.

Although the method of and apparatus for manufacturing a plurality of serrated metal strips from a single strip of feed stock according to the present invention has been described with respect to but a single embodiment of apparatus, it will be recognized by those skilled in the art that modifications and variations to the disclosed apparatus may be made without departing from the spirit of the method and apparatus of the disclosed invention.

What is claimed is:

1. Apparatus for manufacturing a plurality of continuous strips from a single strip of feed stock wherein each of said plurality of continuous strips has a serrated edge and wherein said manufacturing permits formation of each said serrated edge without forming trimming waste, comprising:
    shear means, said shear means including cooperative die elements having cutting surfaces formed to define complementary serrations;
    means for advancing strip feed stock into said shear means; and
    means for displacing said cooperative die elements of said shear means to cause shearing of said single strip of feed stock, said serration defining cutting surfaces of said die elements cooperating to form opposed complementary serrated edges of said plurality of continuous strips.

2. Apparatus according to claim 1 wherein said shear means comprises a bed die, a hold-down die, a reaction die and a cutting die, each said dies having a surface formed to correspond in shape to the serrations to be formed on said plurality of continuous serrated strips, said surfaces being in sliding engagement during operation of said apparatus.

3. Apparatus according to claim 1 including means for straightening said plurality of serrated strips, said means for straightening being disposed longitudinally adjacent the product end of said shear means.

4. Apparatus according to claim 3 including means for positioning said continuous strip transversely upon the entry of said strip into said shear means.

5. Apparatus according to claim 2 wherein said means for displacing said shear means is in operable engagement with said cutting die and wherein said reaction die is vertically aligned with said cutting die and is displaceable in response to vertical movement of said cutting die.

6. Apparatus according to claim 5 wherein said hold-down die is vertically aligned with said bed die and including means for displacing said hold-down die vertically apart from said bed die.

7. Apparatus according to claim 6 wherein said means for vertically displacing said hold-down die includes a slide bolt secured to said hold-down die, said means for displacing said shear means being slidably mounted on said slide bolt and operably engageable with a stop means formed on said slide bolt.

8. Apparatus according to claim 7 including first resilient means for urging said hold-down die into contact with said bed die, and second resilient means for urging said reaction die into contact with said cutting die.

9. Apparatus for manufacturing a plurality of continuous serrated metal strips from a single strip of feed stock, comprising:
means for advancing said single strip of feed stock;
guide means for positioning said single strip of feed stock;
shear means for cutting said single strip of feed stock to form a plurality of continuous serrated strips;
means for imparting force to said shear means to operate said shear means; and
straightening means for removing kinks in said plurality of continuous serrated strips subsequent to the formation of said plurality of continuous serrated strips from said single strip of feed stock.

10. Apparatus according to claim 9 wherein said guide means includes transverse guide means for positioning said strip of feed stock transversely of said apparatus during operation, and vertical guide means for positioning said strip of feed stock material vertically of said apparatus during operation.

11. Apparatus for manufacturing a plurality of continuous strips from a single strip of feed stock wherein each of said plurality of continuous strips has a serrated edge and wherein said manufacturing permits formation of each said serrated edge without forming waste, comprising:
means for advancing said single strip of feed stock, comprising:
means for advancing said single strip of feed stock;
guide means for positioning said single strip of feed stock, said guide means including transverse guide means for positioning said strip of feed stock transversely of said apparatus during operation and vertical guide means for positioning said strip of feed stock vertically of said apparatus during operation;

shear means for cutting said single strip of feed stock to form a plurality of continuous serrated strips, said shear means including a bed die rigidly mounted on a foundation means, a hold down die, a reaction die and a cutting die, each said dies having a surface formed to correspond in shape to the shape of the serrations to be formed in said strip, said surfaces being in sliding engagement during operation of said apparatus such as to define a complementary serrated cutting surface; and
means for imparting force to said shear means to operate said shear means to form said serrated edge on each of said plurality of continuous strips.

12. Apparatus according to claim 11 including first resilient means for urging said hold-down die toward said bed die.

13. Apparatus according to claim 12 including second resilient means for urging said reaction die toward said cutting die.

14. Method of manufacturing a plurality of continuous serrated metal strips from a single strip of feed stock, comprising:
advancing said single strip of feed stock into a shear means;
positioning said single strip of feed stock within said shear means;
advancing said shear means to cut a serration in said continuous strip to form a plurality of continuous serrated strips; and
removing kinks from said plurality of continuous serrated strips.

* * * * *